ns

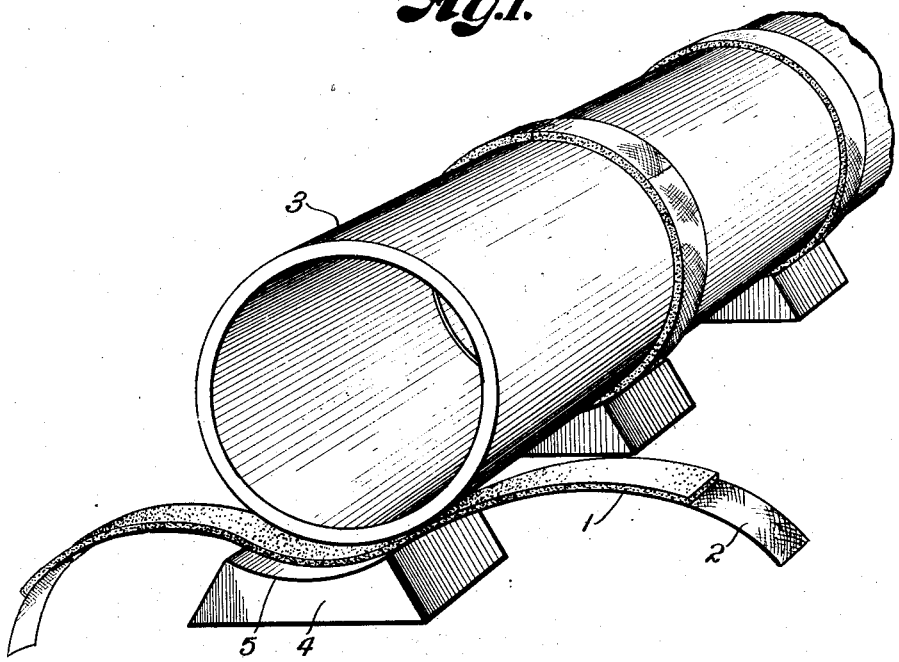
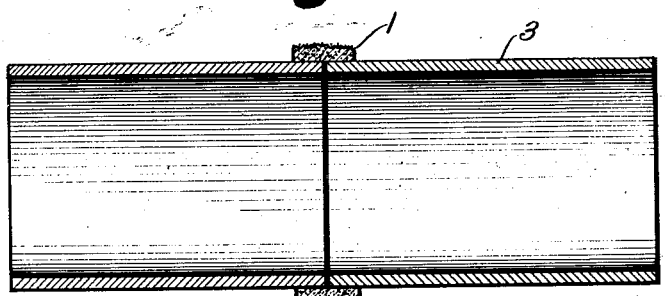

UNITED STATES PATENT OFFICE.

CLINTON S. BURNS, OF KANSAS CITY, MISSOURI.

PIPE-JOINT.

1,259,833.

Specification of Letters Patent.   Patented Mar. 19, 1918.

Application filed December 7, 1914.   Serial No. 875,950.

*To all whom it may concern:*

Be it known that I, CLINTON S. BURNS, a citizen of the United States, residing at Kansas City, in the county of Jackson and State of Missouri, have invented certain new and useful Improvements in Pipe-Joints; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to pipe joints, and has for its principal object to provide means for sealing the joints of sewer or like pipe, otherwise than by the use of a bell and spigot, and thereby eliminating the expense of forming a bell end on each pipe section.

In accomplishing this object, I have provided the improved details of structure hereinafter described and illustrated in the accompanying drawings, wherein:—

Figure I is a perspective view of a number of pipe sections, showing the use and application of my improved joint.

Fig. II is a longitudinal section of abutting pipes and the joint.

Fig. III is a detail view of the joint member.

Referring more in detail to the parts:

1 designates the joint member, which is composed of a waterproof, flexible and adhesive material, such as a tar product, and is carried on a fabric back 2 in order to protect the joint member while the latter is being stored or shipped, and to facilitate the application of the member to a pipe joint. Each section of sealing means is adapted in length to the pipe to be sealed; and one or both ends of the fabric backing may extend beyond the adhesive material.

3 designates the pipe sections, each of which has ends of the same diameter, as distinguished from the usual bell and spigot construction, and 4 designates base blocks having concaved seats 5 for receiving the pipe sections, so that the latter may be supported above the base of the trench and in proper alinement.

In using the joint, the base blocks 4 are seated in a trench, or other place where the pipe is to be laid, and the joint members, which may be carried in rolls or in any suitable manner whereby the adhesive material is protected from other articles or from the drying properties of the air, are opened and laid on the blocks with the fabric side down and the adhesive or joint side toward the top. The pipe sections are then laid on the blocks, with the abutting ends overlying portions of the joint members, so that when the pipes are in position the ends of the joint members may be raised and wrapped about the ends of the abutting pipes to cover and seal the space between the ends of the abutting sections.

It is apparent that as the joint member is raised around the ends of the pipes it would adhere thereto, and that one of the fabric ends may be turned back to overlie the body fabric and the opposite free end be overlapped along the back turned portion. Dirt, or the like, may then be thrown on the overlapping end to hold the band in position until it has become set, or the trench filled. With this construction a sealed joint may be effected without the use of the bell and spigot connection or the use of cement, thereby not only effecting a permanent seal, but also effecting a saving in the cost of the pipe by doing away with the bell ends on the pipe sections.

Having thus described my invention, what I claim as new therein, and desire to secure by Letters-Patent, is:

The combination with abutting pipe sections of a joint sealer inclosing the abutting ends of said section comprising a sealing strip of plastic, adhesive and water proof material mounted on a fabric backing strip, the ends of the backing strip being extended beyond the ends of the sealing material, for the purpose set forth.

In testimony whereof I affix my signature in presence of two witnesses.

CLINTON S. BURNS.

Witnesses:
LYNN A. ROBINSON,
LETA E. COATS.